US011853784B2

(12) United States Patent
Zhou et al.

(10) Patent No.: US 11,853,784 B2
(45) Date of Patent: Dec. 26, 2023

(54) ACCELERATING PARA-VIRTUALIZATION OF A NETWORK INTERFACE USING DIRECT MEMORY ACCESS (DMA) REMAPPING

(71) Applicant: INTEL CORPORATION, Santa Clara, CA (US)

(72) Inventors: Yigang Zhou, Shanghai (CN); Cunming Liang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 798 days.

(21) Appl. No.: 16/463,473

(22) PCT Filed: Dec. 22, 2016

(86) PCT No.: PCT/CN2016/111463
§ 371 (c)(1),
(2) Date: May 23, 2019

(87) PCT Pub. No.: WO2018/112827
PCT Pub. Date: Jun. 28, 2018

(65) Prior Publication Data
US 2019/0354387 A1 Nov. 21, 2019

(51) Int. Cl.
*G06F 9/455* (2018.01)
*G06F 12/0802* (2016.01)
(Continued)

(52) U.S. Cl.
CPC ........ *G06F 9/4555* (2013.01); *G06F 9/45545* (2013.01); *G06F 9/45558* (2013.01);
(Continued)

(58) Field of Classification Search
CPC ................... G06F 3/061; G06F 9/4411; G06F 2009/45579; G06F 12/1081; G06F 2212/151; G06F 2212/152
See application file for complete search history.

(56) References Cited

U.S. PATENT DOCUMENTS 8,667,187 B2 * 3/2014 Thakkar .............. G06F 9/45533
710/22
8,874,803 B2 * 10/2014 Thakkar .............. G06F 9/45558
710/22
(Continued)

FOREIGN PATENT DOCUMENTS

| CN | 103034524 A | 4/2013 |
|---|---|---|
| CN | 103034524 A | 4/2013 |
| CN | 106250166 A | 12/2016 |

OTHER PUBLICATIONS

Motika, Gal et al. "Virtio network paravirtualization driver: Implementation and performance of a de-facto standard." Computer Standards & Interfaces 34.1 (2012): pp. 36-47. (Year: 2012).*

(Continued)

*Primary Examiner* — Van H Nguyen
(74) *Attorney, Agent, or Firm* — Compass IP Law PC

(57) ABSTRACT

An example electronic apparatus is for accelerating a para-virtualization network interface. The electronic apparatus includes a descriptor hub performing bi-directionally communication with a guest memory accessible by a guest and with a host memory accessible by a host. The guest includes a plurality of virtual machines. The host includes a plurality of virtual function devices. The virtual machines are communicatively coupled to the electronic apparatus through a central processing unit. The communication is based upon para-virtualization packet descriptors and network interface controller virtual function-specific descriptors. The electronic apparatus also includes a device association table (Continued)

communicatively coupled to the descriptor hub and to store associations between the virtual machines and the virtual function devices. The electronic apparatus further includes an input-output memory map unit (IOMMU) to perform direct memory access (DMA) remapping and interrupt remapping.

19 Claims, 5 Drawing Sheets

(51) Int. Cl.
*G06F 13/24* (2006.01)
*G06F 13/28* (2006.01)
(52) U.S. Cl.
CPC .......... *G06F 12/0802* (2013.01); *G06F 13/24* (2013.01); *G06F 13/28* (2013.01); *G06F 2009/4557* (2013.01); *G06F 2009/45583* (2013.01); *G06F 2009/45595* (2013.01); *G06F 2213/3808* (2013.01)

(56) References Cited

U.S. PATENT DOCUMENTS

| | | | | |
|---|---|---|---|---|
| 8,990,799 | B1* | 3/2015 | Forecast | G06F 9/45558 718/1 |
| 9,747,249 | B2* | 8/2017 | Cherian | H04L 41/12 |
| 9,934,057 | B2* | 4/2018 | Droux | G06F 9/45558 |
| 2009/0164990 | A1 | 6/2009 | Yehuda et al. | |
| 2010/0070677 | A1* | 3/2010 | Thakkar | G06F 9/45558 711/6 |
| 2012/0084487 | A1* | 4/2012 | Barde | G06F 9/45541 711/6 |
| 2013/0091500 | A1 | 4/2013 | Earl et al. | |
| 2014/0281055 | A1* | 9/2014 | Davda | G06F 12/0862 710/26 |
| 2014/0358972 | A1 | 12/2014 | Guarrieri et al. | |
| 2015/0220354 | A1* | 8/2015 | Nair | G06F 9/45558 710/301 |
| 2015/0293774 | A1 | 10/2015 | Persson et al. | |
| 2015/0301844 | A1* | 10/2015 | Droux | G06F 9/45558 718/1 |
| 2016/0019079 | A1 | 1/2016 | Chawla et al. | |
| 2016/0132443 | A1 | 5/2016 | Davda et al. | |
| 2016/0299858 | A1* | 10/2016 | Ching | G06F 13/24 |
| 2018/0074837 | A1 | 3/2018 | Zhang et al. | |

OTHER PUBLICATIONS

PCT Search Report and Written Opinion prepared for PCT/CN2016/111463, completed Sep. 13, 2017.
Extended European search report for European patent application No. 16924729.3, dated Aug. 5, 2020 (9 pages).
Wei Wang et al., "pvFPGA: Accessing an FPGA-based hardware accelerator in a paravirtualized environment," 2013 International Conference on Hardware/Software Codesign and system Synthesis, Sep. 29, 2013.
First Chinese Office Action of P.R. China State Intellectual Property Office for Patent Application No. 201680091031.X, dated Nov. 11, 2022, 21 pages.
PvFPGA: Accessing an FPGA-based Hardware Accelerator in a Paravirtualized Environment)) ,wei wang et al, ((2013 International conference of hardware/software codesign and system synthesis)).

* cited by examiner

ACCELERATING PARA-VIRTUALIZATION OF A NETWORK INTERFACE USING DIRECT MEMORY ACCESS (DMA) REMAPPING

CROSS REFERENCE TO RELATED APPLICATIONS

The present application is a national stage entry under 35 USC § 371(b) of International Application No. PCT/CN2016/111463, filed Dec. 22, 2016.

BACKGROUND

Para-virtualization (PV) is a technique in which the virtual device in the VM (virtual machine) and the hypervisor can use a virtualization specific means to present a virtual device I/O rather than the hypervisor presenting a completely emulated device. A PV network interface may support live migration of virtual machines.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

Figure 1:
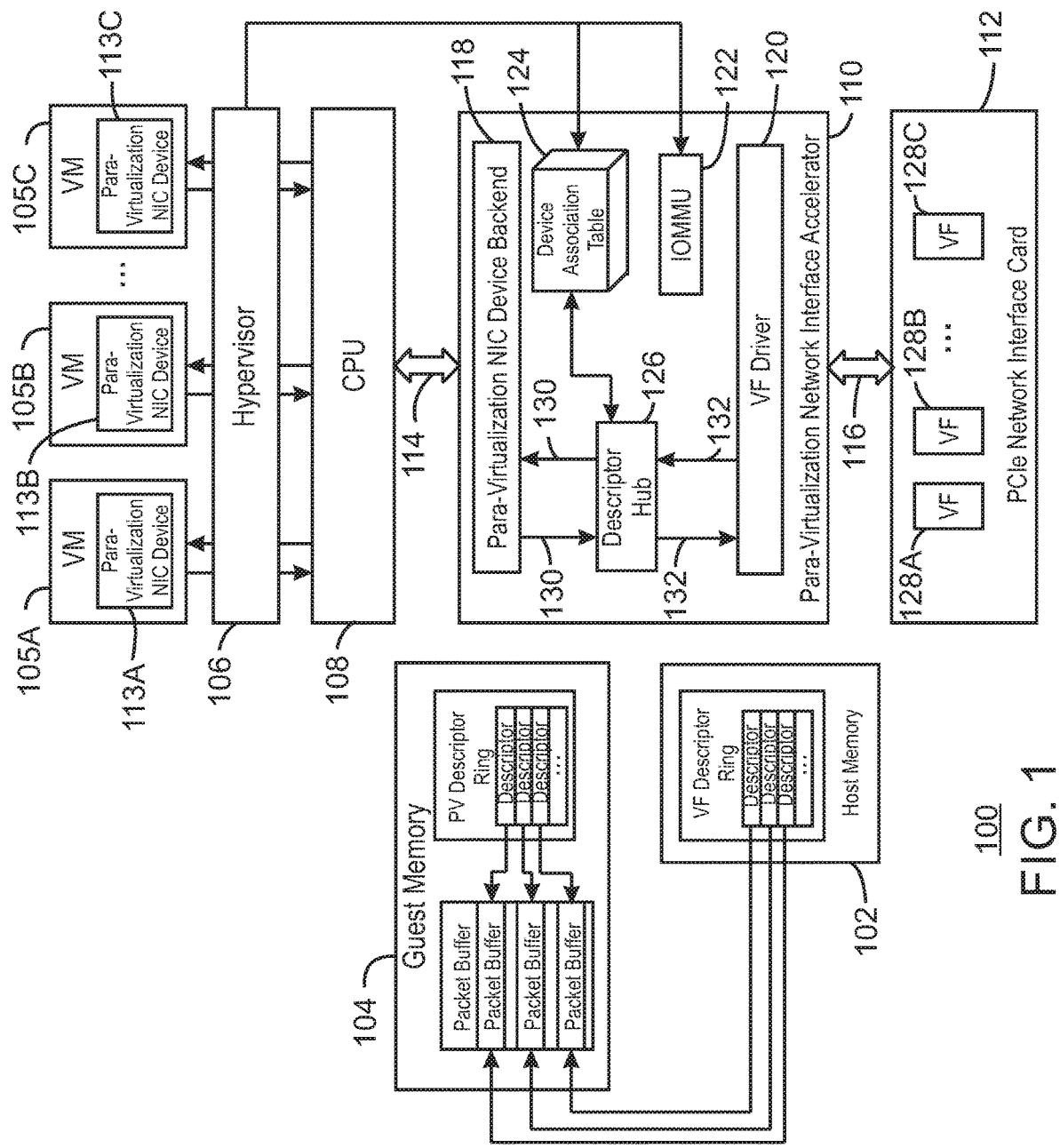
FIG. 1 is a block diagram illustrating an example system for accelerating a para-virtualization network interface.

As described above, PV network interfaces may support live migration of virtual machines. In a data center or cloud environment, a PV network interface may be used as a default network interface controller (NIC) device for tenant VMs. However, performance may be reduced due to the hypervisor intervention and packet copy between guest and host. Thus, the performance may not meet high performance and service-level agreement (SLA) requirements in the high performance public cloud and private cloud environment.

The techniques described herein include an integrated circuit to accelerate PV network interface with a bonded NIC VF. As used herein, "bonding" may refer to one-to-one mapping or correspondence between a virtual function (VF) and an associated virtual machine (VM). The techniques described herein may provide a method and apparatus for using hardware, such as a field-programmable gate array (FPGA) or application-specific integrated circuit (ASIC), instead of CPU cores. Thus, the techniques described herein may improve performance of a mainstream para-virtualization network interface without sacrificing a live migration feature.

The techniques described herein also provide an integrated circuit, which can in some examples be implemented in a FPGA chip, to accelerate a PV network interface with bonded network interface controller (NIC) virtual function (VF). Thus, the techniques described herein may achieve both high performance and live-migrateable goals. In some examples, when instantiating a VM within a PV network interface, the hypervisor may stitch a VF of a physical NIC on the host to the PV network interface, and then the apparatus in the FPGA device may serve as a backend of the PV network device and the driver of the NIC VF. The apparatus in the FPGA device may also move network packets between the physical NIC and VM in a zero-copy manner.

In some examples, the techniques described herein may be implemented in an integrated FPGA chip disposed between or interconnecting the central processing unit (CPU) and NIC PCIe devices. For example, the FPGA chip may be connected to the CPU via processor interconnect. In some examples, the FPGA chip may also be connected to the NIC physical devices via a PCIe link. Compared to an application-specific integrated circuit (ASIC) based implementation, a benefit of FPGA implementation of the present techniques is that it is flexible and programmable to implement various PV interface backend and VF drivers for NICs from different vendors.

In some examples, the techniques described herein may include an apparatus. For example, the apparatus may be a Para-Virtualization Network Interface Accelerator. The apparatus can interface with a PV NIC device. The apparatus can derive a physical NIC device. The apparatus can then move packets between a PV NIC device and a physical NIC device by translating Rx/Tx descriptors in different formats.

Technical benefits of the techniques described herein may include packet I/O and acceleration in FPGA and the provision of a physical NIC that is transparent to VMs. For example, the VMs may only see the PV NIC. Thus, the implementation of FPGA, or some other hardware, may transfer packets more efficiently than would a software implementation.

The techniques described herein may also support live migration to other known devices. For example, the FPGA may provide efficient hardware I/O ports for supporting live migration.

Yet another benefit of the techniques described herein is that they may be less costly and less complicated than Multi-Root I/O Virtualization (MR-IOV). The techniques described herein may also provide similar performance to MR-IOV, while maintaining compatibility with MR-IOV. The FPGA may also be flexible enough to be compatible with hardware produced by different vendors.

The present disclosure may introduce a "bonding VF device" mechanism in FPGA to bond NIC VF on the host to the PV network interface in the VM, so it still has the high performance and live-migratable benefits in comparison to the bonding driver based approach. In addition, a benefit of the present disclosure is that the underlying packet I/O and acceleration circuit in the FPGA and physical NIC device are completely transparent to the VMs, which only need to include the simple PV NIC device and the corresponding driver.

FIG. 1 illustrates an example system for accelerating a para-virtualization network interface. The system 100 includes a host memory 102, a guest memory 104, virtual machines 105A, 105B, 105C, a hypervisor 106, a CPU 108, a para-virtualization network interface accelerator 110, and a PCIe network interface card 112. In some examples, the guest memory 104 may be disposed in random access memory (RAM). Each of virtual machines 105A, 105B, 105C, includes a para-virtualization NIC device 113A, 113B, 113C, respectively. A processor interconnect 114 interconnects CPU 108 and para-virtualization network interface accelerator 110. A PCIe link 116 interconnects para-virtualization network interface accelerator 110 and PCIe network interface card 112.

As illustrated in FIG. 1, the para-virtualization network interface accelerator 110 includes a PV device backend 118, a NIC VF driver 120, an input-output memory map unit (IOMMU) 122, a device association table 124, and a descriptor hub 126. The PV device backend 118 may interact with the PV network interface 113 of the VM for packet input/output (I/O) based on receive (Rx) and transmit (Tx) queue pairs residing in the VM memory.

A NIC VF driver 120 may initialize a given NIC VF device 128A, 128B, 128C, and fill the packet Rx/Tx descriptors with memory pointers pointing to corresponding Rx/Tx packet buffers in the VM memory.

In some examples, the IOMMU 122 may be dedicated for a PCIe device connecting to the para-virtualization network interface accelerator 110, and may be initialized by hypervisor 106. For example, the IOMMU 122 may be responsible for direct memory access (DMA) remapping and interrupt remapping. In some examples, IOMMU 122 may be responsible for memory address translation.

A device association table 124 may also be initialized by hypervisor 106 to store a 1:1 bonding relationship between each PV NIC device 113A, 113B, 113C, and a respective one of the NIC VF devices 128A, 128B, 128C. Thus, a packet from one of NIC VF devices 128A, 128B, or 128C, may be received by the appropriate PV NIC device 113A, 113B, or 113C, and vice versa.

The system 100 may also include a descriptor hub 126 to bridge the PV Rx/Tx queue pairs 130 and the NIC VF Rx/Tx queue pairs 132 by translating and forwarding PV packet descriptors and NIC VF specific descriptors bi-directionally. A descriptor, as used herein, is a data structure that describes a packet. A descriptor may include, for example, a media access control (MAC) header, an Internet protocol (IP) header, a header length, a payload length, or any combination thereof.

In some examples, the PV device backend 118 and the NIC VF driver 120 may be implemented either in software or inside an FPGA to drive the PV network interfaces 113A, 113B, 113C and NIC VF 128, respectively, for fast packet I/O. In some examples, the VF driver 120 or the para-virtualization NIC device backend 118 may be implemented using software.

In some examples, the hypervisor 106 can initialize the DMA remapping table inside the IOMMU. The hypervisor 106 can also, bond the PV network interface 113 with a VF interface on the host. The VM 105A, 105B, 105C with PV network interface 113A, 113B, 113C can be instantiated by the hypervisor 106. For example, the hypervisor can assign a media access control (MAC) address of each PV NIC interface 113A, 113B, 113C to an associated VF 128A, 128B, 128C via the NIC VF driver 120.

In some examples, during system initialization, the PV acceleration-aware hypervisor 106 can initialize the IOMMU 122. A NIC physical function (PF) device (not shown) can create multiple VFs 128A, 128B, 128C for a physical PCIe NIC device 112.

In some examples, a user may instantiate a VM by specifying a NIC VF 128 to be allocated for an instance. The hypervisor 106 can then start a VM within a PV NIC device 113A, 113B, or 113C. In some examples, the hypervisor 106 can also assign a VF 128A, 128B, or 128C specified in a Bus:Number:Function format to the NIC PV interface 113A, 113B, or 113C.

In some examples, the hypervisor 106 can initialize the device association table 124 in the para-virtualization network interface accelerator 110 to store the 1:1 bonding relationship of the VF device 128A, 128B, or 128C and the associated VM 105A, 105B, or 105C. In some examples, the descriptor hub 126 may look up a VF identification in the device association table 124 to identify the associated VM 105A, 105B, or 105C.

In some examples, the hypervisor 106 may use a suitable address translation table in the IOMMU 122 based on the Bus:Number:Function of the associated VF 128, and then add an entry into the table using a guest physical address (GPA), access, Bus:Number:Function, and size.

In some examples, once the VM is started, the PV NIC device 113 can perform a hand-shake with the PV Device Backend 118. The PV device 113 can then notify the PV Device Backend 118 about memory regions in the guest memory 104 used as a packet receive/transmit buffer. In some examples, the PV device backend 118 can then identify the memory regions to the VF driver 120 to initialize the Rx/Tx descriptors on the VF 128 with the GPA. In this way, the VF driver may use the GPA to program the Rx/Tx descriptors on the Rx/Tx descriptor rings of the VF 128A, 128B, or 128C.

The diagram of FIG. 1 is not intended to indicate that the example computer arrangement 100 is to include all of the components shown in FIG. 1. Rather, the example computer arrangement 100 may have fewer or additional components not illustrated in FIG. 1 (e.g., additional memory devices, etc.).

Figure 2:
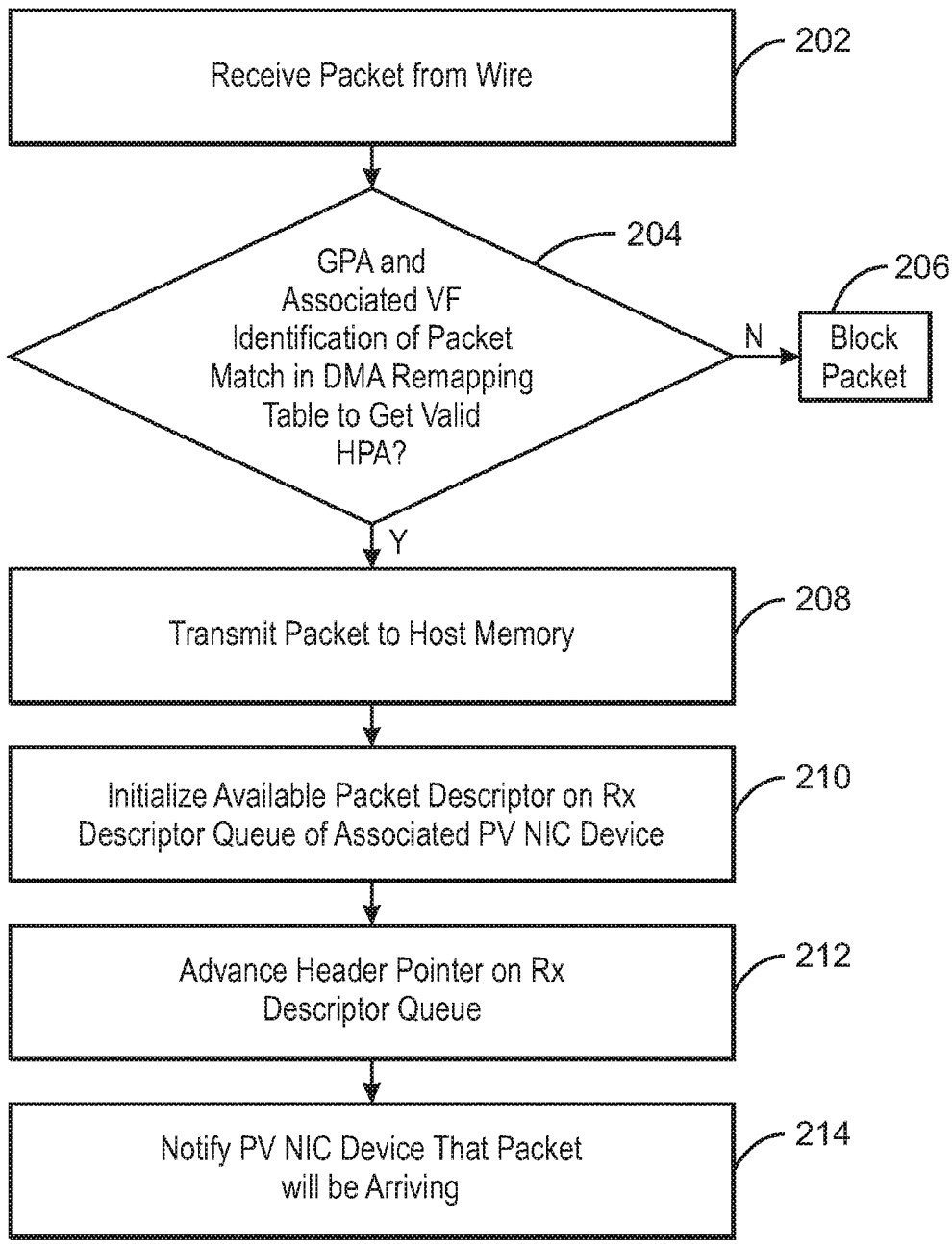
FIG. 2 is a flow chart of a method of facilitating the flow of a packet received from the wire to a VM.

FIG. 2 illustrates a method of facilitating the flow of a packet received from the wire to a VM. The method is generally referenced using the reference number 200 and can be implemented in the system 100 of FIG. 1 above or in the electronic apparatus 400 of FIG. 4 below.

In a first block 202, a NIC receives a packet from a wire. In block 204, it is determined whether the GPA and associated VF identification of the packet match in the DMA remapping table to get a valid HPA (Host Physical Address). If not, then the method may proceed at block 206. Conversely, if there is a match, then the method may proceed at block 208.

At block 206, the packet is blocked. For example, the packet may be prevented from reaching the VM. In some examples, an IOMMU may block the packet DMA if the GPA and associated VF identification (in Bus:Number:Function format) does not match in the DMA remapping table to get a valid HPA. At block 208, the packet is transmitted to a host memory. For example, when a packet is received from a physical NIC, the embedded layer 2 (L2) switch of the NIC can determine the destination VF based on the packet destination MAC address. In some examples, the packets may then be transmitted to the host memory based on the GPA, which may be programmed by the NIC VF driver in the VF Rx descriptor. Once the packets are transmitted, the descriptor hub is notified about incoming packets by the NIC VF driver. In some examples, the descriptor hub may first look up the device association table using the VF's Bus:Number:Function to get an associated PV NIC device.

At block 210, an available packet descriptor is initialized on the Rx descriptor queue of the associated PV NIC device. For example, the descriptor hub can initialize an available packet descriptor on the Rx descriptor queue of the associated PV NIC device 113 by filling the same GPA pointing to the packet data. At block 212, once the packet descriptor is initialized, the header pointer on the Rx descriptor queue can be advanced. For example, the PV device backend 118 can advance the header pointer on the Rx descriptor queue. At block 214, the PV NIC device 113 is notified that a packet will be arriving. Thus, moving Rx packets from host to VMs may be performed in a secure and zero copy fashion.

The flow chart of FIG. 2 is not intended to indicate that the example method 200 is to include all of the components shown in FIG. 2. Rather, the example method 200 may have fewer or additional blocks not illustrated in FIG. 2.

Figure 3:
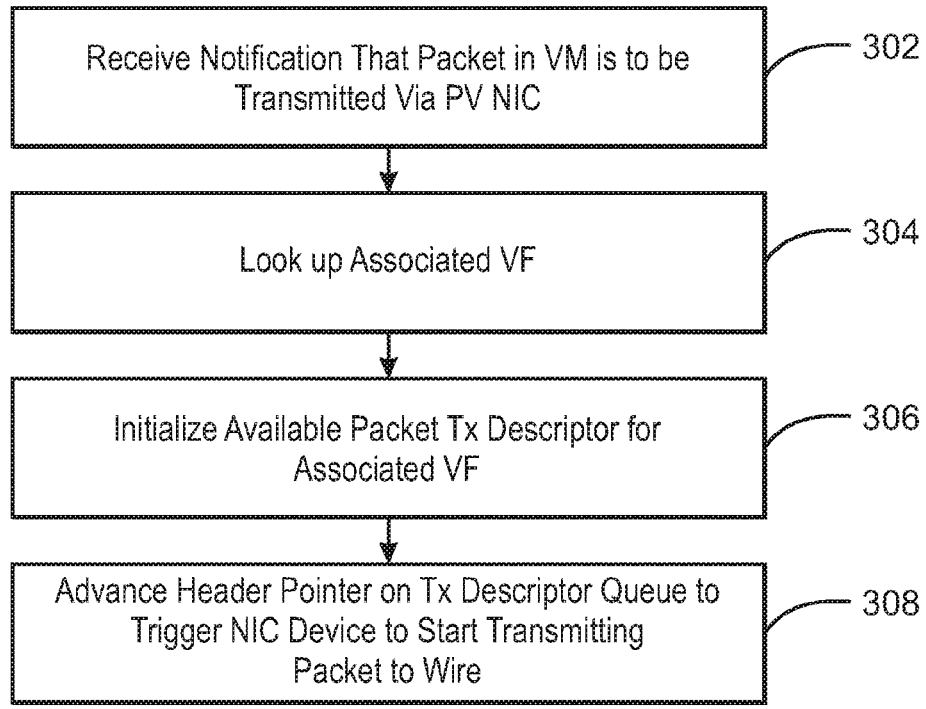
FIG. 3 is a flow chart of a method of facilitating the flow of a packet received from a VM to the wire.

FIG. 3 illustrates a method of facilitating the flow of a packet received from a VM to a wire. The method is generally referenced using the reference number 300 and can be implemented in the system 100 of FIG. 1 above or in the electronic apparatus 400 of FIG. 4 below.

In a first block 302, a notification is received that a packet in the VM is to be transmitted via a PV NIC. For example, on the Tx side, when a PV NIC device in the VM notifies a PV device backend that there is a packet that needs to be transmitted, the descriptor hub 126 can be notified immediately.

At block 304, an associated VF is looked up. For example, the descriptor hub 126 may look up the device association table 124 using the PV NIC device ID to get the associated VF 128.

At block 306, an available packet Tx descriptor is initialized for the associated VF. For example, descriptor hub 126 may initialize an available packet descriptor on the Tx descriptor queue of the associated VF 128 by filling the same GPA pointing to the packet data in the VM.

At block 308, the header pointer is advanced on the Tx descriptor queue to trigger the NIC device to start transmitting a packet to the wire. For example, once the Tx packet descriptor is initialized, the VF driver 120 can advance the header pointer on the Tx descriptor queue to trigger the NIC device to start transmitting a packet to the wire.

The flow chart of FIG. 3 is not intended to indicate that the example method 300 is to include all of the components shown in FIG. 3. Rather, the example method 300 may have fewer or additional blocks not illustrated in FIG. 3.

Figure 4:
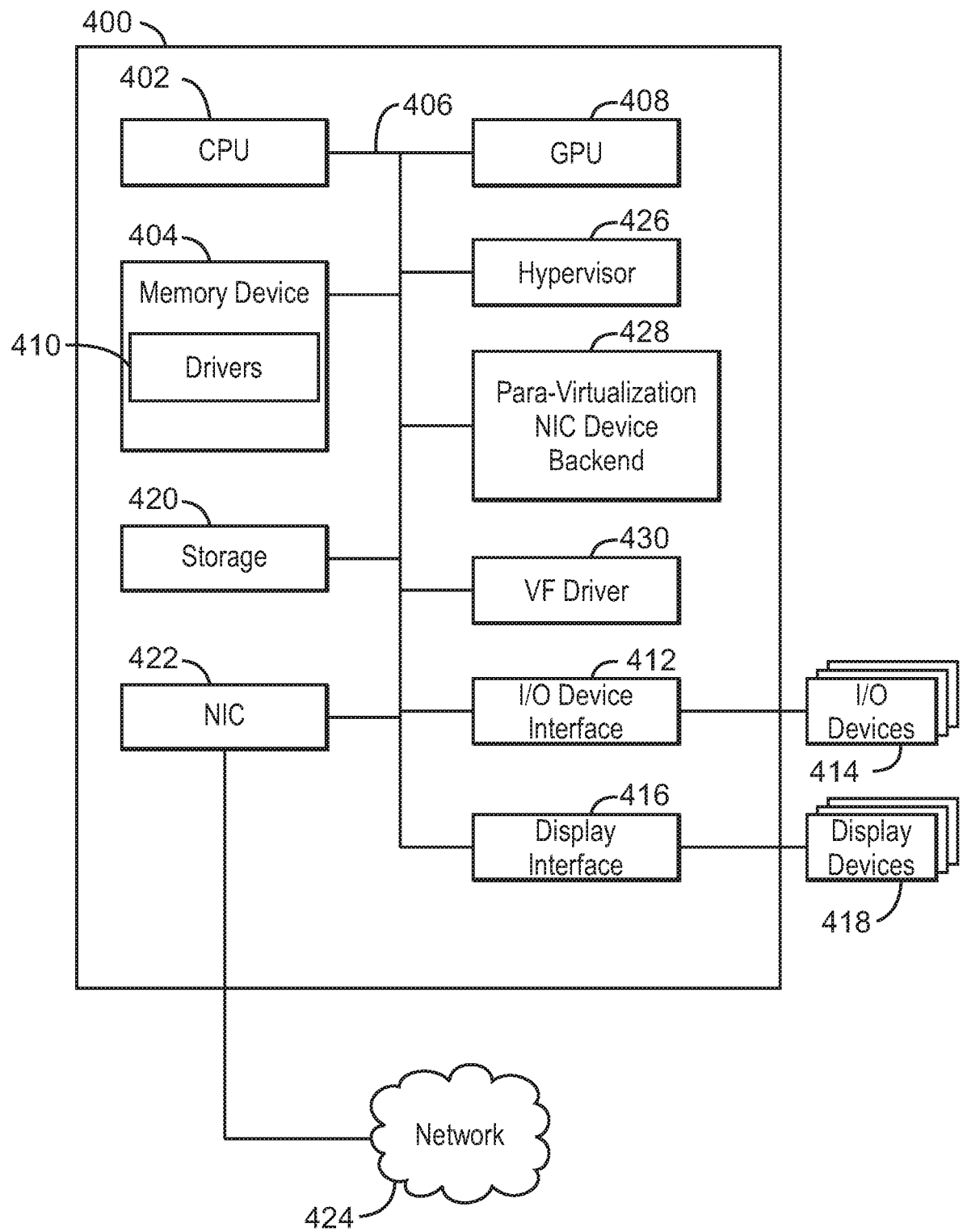
FIG. 4 is a block diagram illustrating an example electronic apparatus for accelerating a para-virtualization network interface.

Referring now to FIG. 4, a block diagram is shown illustrating an example electronic apparatus 400 for accelerating a para-virtualization network interface. The electronic apparatus 400 may be, for example, a computing device such as a laptop computer, desktop computer, tablet computer, smartphone, mobile device, a cloud computing node, or a server, among others. The electronic apparatus 400 may include a central processing unit (CPU) 402 that is configured to execute stored instructions, as well as a memory device 404 that stores instructions that are executable by the CPU 402. The CPU 402 may be coupled to the memory device 404 by a bus 406. Additionally, the CPU 402 can be a single core processor, a multi-core processor, a computing cluster, or any number of other configurations. Furthermore, the electronic apparatus 400 may include more than one CPU 402. In some examples, the CPU 402 may be a system-on-chip (SoC) with a multi-core processor architecture. The memory device 404 can include random access memory (RAM), read only memory (ROM), flash memory, or any other suitable memory systems. For example, the memory device 404 may include dynamic random access memory (DRAM).

The memory device 404 can include random access memory (RAM), read only memory (ROM), flash memory, or any other suitable memory systems. For example, the memory device 404 may include dynamic random access memory (DRAM).

The electronic apparatus 400 may also include a graphics processing unit (GPU) 408. As shown, the CPU 402 may be coupled through the bus 406 to the GPU 408. The GPU 408 may be configured to perform any number of graphics operations within the electronic apparatus 400. For example, the GPU 408 may be configured to render or manipulate graphics images, graphics frames, videos, or the like, to be displayed to a user of the electronic apparatus 400.

In some examples, the memory device 404 may include device drivers 410 that are configured to execute instructions for transferring packets. The device drivers 410 may be software, an application program, application code, or the like.

The CPU 402 may also be connected through the bus 406 to an input/output (I/O) device interface 412 configured to connect the electronic apparatus 400 to one or more I/O devices 414. The I/O devices 414 may include, for example, a keyboard and a pointing device, wherein the pointing device may include a touchpad or a touchscreen, among others. The I/O devices 414 may be built-in components of the electronic apparatus 400, or may be devices that are externally connected to the electronic apparatus 400. In some examples, the memory 404 may be communicatively coupled to I/O devices 414 through direct memory access (DMA).

The CPU 402 may also be linked through the bus 406 to a display interface 416 configured to connect the electronic apparatus 400 to a display device 418. The display devices 418 may include a display screen that is a built-in component of the electronic apparatus 400. The display devices 418 may also include a computer monitor, television, or projector, among others, that is internal to or externally connected to the electronic apparatus 400.

The electronic apparatus 400 also includes a storage device 420. The storage device 420 is a physical memory such as a hard drive, an optical drive, a thumbdrive, an array of drives, a solid-state drive, or any combinations thereof. The storage device 420 may also include remote storage drives.

The electronic apparatus 400 may also include a network interface controller (NIC) 422. The NIC 422 may be configured to connect the electronic apparatus 400 through the bus 406 to a network 424. The network 424 may be a wide area network (WAN), local area network (LAN), or the Internet, among others. In some examples, the apparatus may communicate with other devices through a wireless technology. For example, the apparatus may communicate with other devices via a wireless local area network connection. In some examples, the apparatus may connect and communicate with other devices via Bluetooth® or similar technology.

The electronic apparatus 400 may also include a hypervisor 426, a para-virtualization NIC device backend 428, and a VF driver 430 as discussed above.

The block diagram of FIG. 4 is not intended to indicate that the electronic apparatus 400 is to include all of the components shown in FIG. 4. Rather, the electronic apparatus 400 can include fewer or additional components not illustrated in FIG. 4, such as additional storage devices, and the like. The electronic apparatus 400 may include any number of additional components not shown in FIG. 4, depending on the details of the specific implementation. Furthermore, any of the functionalities of the CPU 402 may be partially, or entirely, implemented in hardware and/or in a processor.

Figure 5:
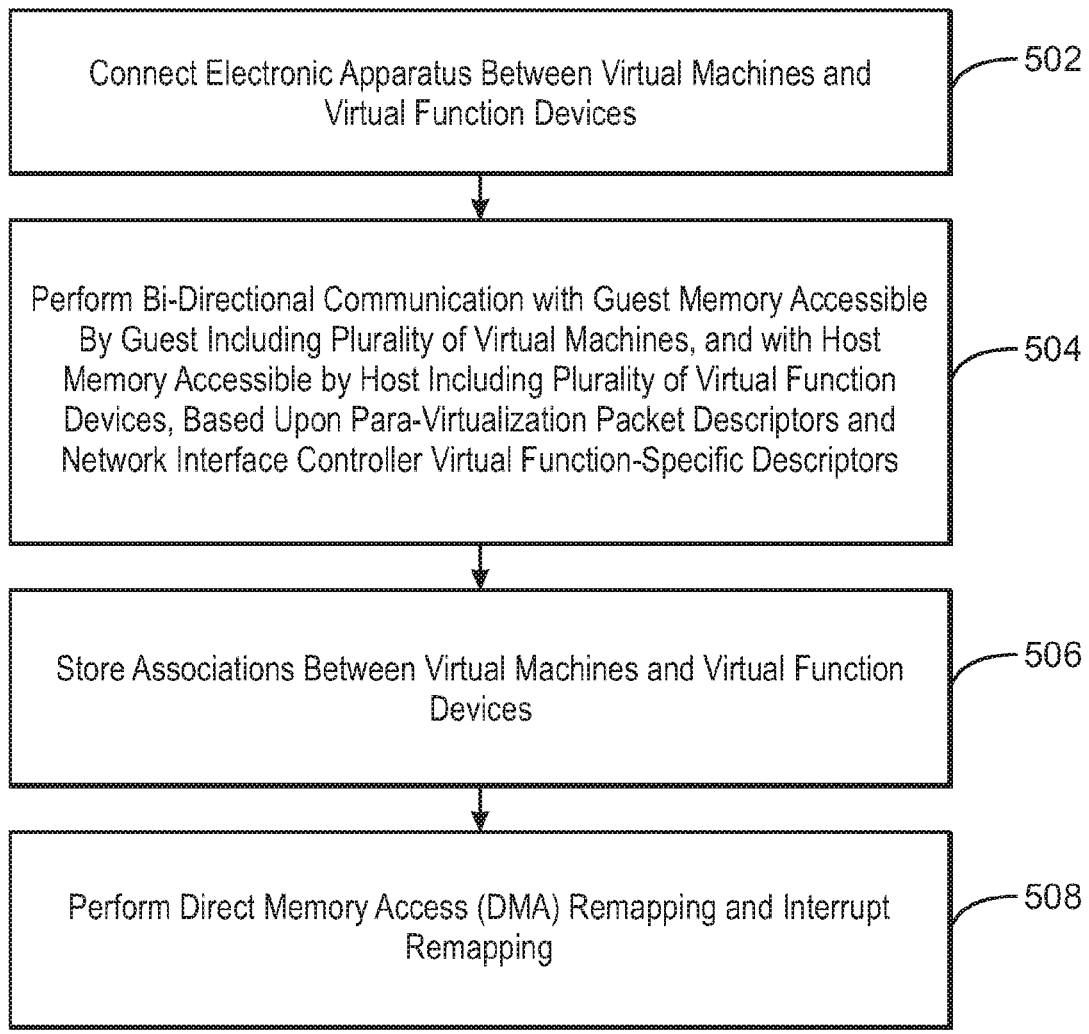
FIG. 5 is a flow chart illustrating a method of interfacing between two devices.

FIG. 5 is a flow chart illustrating a method 500 of interfacing between two devices. The method is generally referenced using the reference number 500 and can be implemented in the system 100 of FIG. 1 above or in the electronic apparatus 400 of FIG. 4.

At block 502, an electronic apparatus is connected between a set of virtual machines and a set of virtual function devices. For example, the electronic apparatus can be connected to the virtual machines through a central processing unit. In some examples, a para-virtualization network interface accelerator may be connected between virtual machines VM and virtual function devices. For example, the para-virtualization network interface accelerator is connected to virtual machines VM through a CPU.

At block 504, a bi-directional communication with a guest memory accessible by a guest including a plurality of virtual machines, and with a host memory accessible by a host including a plurality of virtual function devices is performed. For example, the communication can be based on para-virtualization packet descriptors and network interface controller virtual function-specific descriptors. In some examples, the bi-directional communication can be performed by a descriptor hub within the electronic apparatus. For example, descriptor hub can perform bi-directional communication with a guest memory accessible by a guest including a plurality of virtual machines VM, and with a host memory accessible by a host comprising a plurality of virtual function devices.

At block 506, associations between the virtual machines and the virtual function devices are stored. In some examples, the storing can be performed via a device association table disposed within the electronic apparatus and communicatively coupled to the descriptor hub. For example, associations between the virtual machines VM and the virtual function devices can be stored by device association table disposed within para-virtualization network interface accelerator and communicatively coupled to the descriptor hub.

At block 508, direct memory access (DMA) remapping and interrupt remapping are performed by an input-output memory map unit (IOMMU) disposed within the electronic apparatus. For example, input-output memory map unit (IOMMU) can perform direct memory access (DMA) remapping and interrupt remapping.

The flow chart of FIG. 5 is not intended to indicate that the example method 500 is to include all of the components shown in FIG. 5. Rather, the example method 500 may have fewer or additional blocks not illustrated in FIG. 5.

Examples

Example 1 is an example electronic apparatus for accelerating a para-virtualization network interface. The electronic apparatus includes a descriptor hub performing bi-directionally communication with a guest memory accessible by a guest and with a host memory accessible by a host. The guest includes a plurality of virtual machines. The host includes a plurality of virtual function devices. The virtual machines are communicatively coupled to the electronic apparatus through a central processing unit. The communication is based on para-virtualization packet descriptors and network interface controller virtual function-specific descriptors. The electronic apparatus also includes a device association table that is communicatively coupled to the descriptor hub and to store associations between the virtual machines and the virtual function devices. The electronic apparatus further includes an input-output memory map unit (IOMMU) to perform direct memory access (DMA) remapping and interrupt remapping.

Example 2 includes the apparatus of example 1, including or excluding optional features. In this example, the communication performed by the descriptor hub includes translations of the para-virtualization packet descriptors and network interface controller virtual function-specific descriptors.

Example 3 includes the apparatus of example 1, including or excluding optional features. In this example, the descriptor hub, the device association table, and the input-output memory map unit (IOMMU) include a field programmable gate array or an application-specific integrated circuit.

Example 4 includes the apparatus of example 1, including or excluding optional features. In this example, the device association table and the input-output memory map unit (IOMMU) are configured to be initialized by a hypervisor. The hypervisor is communicatively coupled to the virtual machines and to the central processing unit.

Example 5 includes the apparatus of example 1, including or excluding optional features. In this example, the input-output memory map unit (IOMMU) is to perform direct memory access (DMA) remapping and interrupt remapping for the guest memory and the host memory.

Example 6 includes the apparatus of any combination of examples 1-5, including or excluding optional features. In this example, the apparatus includes a virtual function driver in bi-directional communication with the descriptor hub. The virtual function driver initializes the virtual function devices and fills packet Rx/Tx descriptors with memory pointers pointing to corresponding Rx/Tx packet buffers in the guest memory.

Example 7 includes the apparatus of example 1, including or excluding optional features. In this example, the apparatus includes a para-virtualization network interface controller (NIC) device backend in bi-directional communication with the descriptor hub. The para-virtualization network interface controller (NIC) device backend is to interact with the virtual machines for packet input/output (I/O) based on receive (Rx) and transmit (Tx) queue pairs residing in the guest memory.

Example 8 includes the apparatus of example 7, including or excluding optional features. In this example, the apparatus includes a virtual function driver in bi-directional communication with the descriptor hub. The para-virtualization network interface controller (NIC) device backend identifies memory regions to the virtual function driver to initialize Rx/Tx descriptors on the virtual function devices.

Example 9 includes the apparatus of any combination of examples 1-5, including or excluding optional features. In this example, the descriptor hub is to search identifications of the virtual function devices in the device association table to identify the associated virtual machines.

Example 10 includes the apparatus of any combination of examples 1-5, including or excluding optional features. In this example, the electronic apparatus lacks a central processing unit.

Example 11 is an example method of interfacing between two devices. The method includes connecting an electronic apparatus between the virtual machines and the virtual function devices. The electronic apparatus is connected to the virtual machines through a central processing unit. The method includes performing bi-directional communication with a guest memory accessible by a guest and with a host memory accessible by a host. The guest includes a plurality of virtual machines. The host includes a plurality of virtual function devices. The communication is based upon para-virtualization packet descriptors and network interface controller virtual function-specific descriptors. The bi-directional communication is performed by a descriptor hub within the electronic apparatus. The method includes storing associations between the virtual machines and the virtual function devices. The storing is performed by a device association table disposed within the electronic apparatus and communicatively coupled to the descriptor hub. The method further includes performing direct memory access (DMA) remapping and interrupt remapping. The remapping is performed by an input-output memory map unit (IOMMU) disposed within the electronic apparatus.

Example 12 includes the method of example 11, including or excluding optional features. In this example, the communication performed by the descriptor hub includes translations of the para-virtualization packet descriptors and network interface controller virtual function-specific descriptors.

Example 13 includes the method of example 11, including or excluding optional features. In this example, the descriptor hub, the device association table, and the input-output memory map unit (IOMMU) are included in a field programmable gate array or in an application-specific integrated circuit.

Example 14 includes the method of example 11, including or excluding optional features. In this example, the device association table and the input-output memory map unit (IOMMU) are initialized by a hypervisor. The hypervisor is communicatively coupled to the virtual machines and to the central processing unit.

Example 15 includes the method of example 11, including or excluding optional features. In this example, the input-output memory map unit (IOMMU) performs direct memory access (DMA) remapping and interrupt remapping for the guest memory and the host memory.

Example 16 includes the method of any combination of examples 11-15, including or excluding optional features. In this example, the virtual function devices are initialized and packet Rx/Tx descriptors are filled with memory pointers pointing to corresponding Rx/Tx packet buffers in the guest memory. The initializing and filling is performed by a virtual function driver in bi-directional communication with the descriptor hub.

Example 17 includes the method of example 11, including or excluding optional features. In this example, the method includes interacting with the virtual machines for packet input/output (I/O) based on receive (Rx) and transmit (Tx) queue pairs residing in the guest memory. The interacting is performed by a para-virtualization network interface controller (NIC) device backend that is in bi-directional communication with the descriptor hub.

Example 18 includes the method of example 17, including or excluding optional features. In this example, the method further includes identifying memory regions to the virtual function driver to initialize Rx/Tx descriptors on the virtual function devices. The identifying is performed by the para-virtualization network interface controller (NIC) device backend. A virtual function driver is in bi-directional communication with the descriptor hub.

Example 19 includes any combination of the methods of examples 11-15, including or excluding optional features. In this example, the descriptor hub searches identifications of the virtual function devices in the device association table to identify the associated virtual machines.

Example 20 includes the method of example 11, including or excluding optional features. In this example, the electronic apparatus lacks a central processing unit.

Example 21 includes the method of any combination of examples 11-15, including or excluding optional features. In this example, live migration of at least one of the virtual machines is performed by use of the electronic apparatus.

Example 22 is an example system for accelerating a para-virtualization network interface. The electronic apparatus includes means for performing bi-directional communication with a guest memory accessible by a guest having a plurality of virtual machines, and with a host memory accessible by a host having a plurality of virtual function devices. The virtual machines are communicatively coupled to the system through a central processing unit. The communication is based upon para-virtualization packet descriptors and network interface controller virtual function-specific descriptors. The electronic apparatus also includes means for storing associations between the virtual machines and the virtual function devices. The means for storing associations is communicatively coupled to the means for performing bi-directional communication. The electronic apparatus further includes means for performing direct memory access (DMA) remapping and interrupt remapping.

Example 23 includes the system of example 22, including or excluding optional features. In this example, the communication performed by the means for performing bi-directional communication includes translations of the para-virtualization packet descriptors and network interface controller virtual function-specific descriptors.

Example 24 includes the system of example 22, including or excluding optional features. In this example, the means for performing bi-directional communication, the means for storing associations, and the means for performing DMA remapping and interrupt remapping are embodied in a field programmable gate array or in an application-specific integrated circuit.

Example 25 includes the system of example 22, including or excluding optional features. In this example, the means for storing associations and the means for performing DMA remapping and interrupt remapping are configured to be initialized by a hypervisor. The hypervisor is communicatively coupled to the virtual machines and to the central processing unit.

Example 26 includes the system of example 22, including or excluding optional features. In this example, the means for performing DMA remapping and interrupt remapping performs direct memory access (DMA) remapping and interrupt remapping for the guest memory and the host memory.

Example 27 includes the system of example 22, including or excluding optional features. In this example, a virtual function driver is in bi-directional communication with the means for performing bi-directional communication. The virtual function driver is to initialize the virtual function devices and to fill packet Rx/Tx descriptors with memory pointers pointing to corresponding Rx/Tx packet buffers in the guest memory.

Example 28 includes the system of example 22, including or excluding optional features. In this example, the system includes a para-virtualization network interface controller (NIC) device backend in bi-directional communication with the means for performing bi-directional communication. The para-virtualization network interface controller (NIC) device backend is to interact with the virtual machines for packet input/output (I/O) based on receive (Rx) and transmit (Tx) queue pairs residing in the guest memory.

Example 29 includes the system of example 28, including or excluding optional features. In this example, the system includes a virtual function driver in bi-directional communication with the means for performing bi-directional communication. The para-virtualization network interface controller (NIC) device backend identifies memory regions to the virtual function driver to initialize Rx/Tx descriptors on the virtual function devices.

Example 30 includes the system of example 22, including or excluding optional features. In this example, the means for performing bi-directional communication searches identifications of the virtual function devices in the means for storing associations to identify the associated virtual machines.

Example 31 includes the system of example 22, including or excluding optional features. In this example, the system lacks a central processing unit.

Example 32 is an example para-virtualization computer system including a host having a plurality of virtual function devices and a host memory. The system includes a guest includes a plurality of virtual machines and a guest memory. The system includes an interface arrangement that interfaces between the host and the guest. The interface arrangement includes a central processing unit. The interface arrangement includes a hypervisor software module communicatively coupling the virtual machines to the central processing unit. A para-virtualization network interface accelerator is embodied in a field programmable gate array. The para-virtualization network interface accelerator includes a descriptor hub configured to perform bi-directional communication with the guest memory and the host memory. The communication is based upon para-virtualization packet descriptors and network interface controller virtual function-specific descriptors. The para-virtualization network interface accelerator also includes a device association table communicatively coupled to the descriptor hub and stores associations between the virtual machines and the virtual function devices. The para-virtualization network interface accelerator further includes an input-output memory map unit (IOMMU) to perform direct memory access (DMA) remapping and interrupt remapping. The para-virtualization network interface accelerator also further includes a virtual function driver in bi-directional communication with the descriptor hub. The para-virtualization network interface accelerator includes a para-virtualization network interface controller (NIC) device backend in bi-directional communication with the descriptor hub.

Example 33 includes the system of example 32, including or excluding optional features. In this example, the communication performed by the descriptor hub comprises translations of the para-virtualization packet descriptors and network interface controller virtual function-specific descriptors.

Example 34 includes the system of example 32, including or excluding optional features. In this example, the device association table and the input-output memory map unit (IOMMU) are configured to be initialized by the hypervisor.

Example 35 includes the system of example 32, including or excluding optional features. In this example, the input-output memory map unit (IOMMU) is to perform direct memory access (DMA) remapping and interrupt remapping for the guest memory and the host memory.

Example 36 includes the system of any combination of examples 32-35, including or excluding optional features. In this example, the virtual function driver initializes the virtual function devices and fills packet Rx/Tx descriptors with memory pointers pointing to corresponding Rx/Tx packet buffers in the guest memory.

Example 37 includes the system of example 32, including or excluding optional features. In this example, the para-virtualization network interface controller (NIC) device backend interacts with the virtual machines for packet input/output (I/O) based on receive (Rx) and transmit (Tx) queue pairs residing in the guest memory.

Example 38 includes the system of example 32, including or excluding optional features. In this example, the para-virtualization network interface controller (NIC) device backend identifies memory regions to the virtual function driver to initialize Rx/Tx descriptors on the virtual function devices.

Example 39 includes the system of example 32, including or excluding optional features. In this example, the descriptor hub searches identifications of the virtual function devices in the device association table to identify the associated virtual machines.

Example 40 includes the system of any combination of examples 32-35 and 37-39, including or excluding optional features. In this example, the para-virtualization network interface accelerator lacks a central processing unit.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:
1. An apparatus comprising:
  circuitry to:

generate transmit packet descriptors for packets received from a plurality of para-virtualized virtual machines (VMs) that are separately associated with a respective network interface controller (NIC) virtual function (VF) device from among a plurality of NIC VF devices to enable data for a packet generated by a respective para-virtualized VM to be provided to an associated NIC VF device in a zero copy fashion; and generate receive packet descriptors for packets received through the plurality of NIC VF devices that are targeting the plurality of para-virtualized VMs to enable data for a packet received via the respective NIC VF device to be provided to the respective para-virtualized VM in a zero copy fashion, wherein the respective para-virtualized VM is associated with the respective NIC VF device based on a device association table.

2. The apparatus of claim 1, wherein the device association table indicates a 1:1 bonding relationship between the respective para-virtualized VM and the respective NIC VF device.

3. The apparatus of claim 1, wherein the circuitry comprises a field programmable gate array or an application-specific integrated circuit.

4. The apparatus of claim 1, wherein the circuitry is configured to be initialized by a hypervisor.

5. The apparatus of claim 1, wherein the circuitry includes an input-output memory map unit (IOMMU) to perform direct memory access (DMA) remapping and interrupt remapping for a guest memory space arranged to maintain the data for the packet generated by the respective para-virtualized VM and for a host memory space arranged to maintain the data for the packet received via the respective NIC VF device.

6. The apparatus of claim 5, the circuitry further comprising a VF driver to initialize the plurality of NIC VF devices and to fill receive/transmit packet descriptors with memory pointers pointing to corresponding receive and transmit packet buffers maintained in the guest memory space.

7. The apparatus of claim 6, the circuitry further comprising a para-virtualization NIC device backend to interact with the plurality of para-virtualized VMs for packet input/output (I/O) based on receive and transmit queue pairs residing in the receive and transmit packet buffers maintained in the guest memory space.

8. A method comprising:
generating transmit packet descriptors for packets received from a plurality of para-virtualized virtual machines (VMs) that are separately associated with a respective network interface controller (NIC) virtual function VF device from among a plurality of NIC VF devices to enable data for a packet generated by a respective para-virtualized VM to be provided to an associated NIC VF device in a zero copy fashion; and
generating receive packet descriptors for packets received through the plurality of NIC VF devices that are targeting the plurality of para-virtualized VMs to enable data for a packet received via the respective NIC VF device to be provided to the respective para-virtualized VM in a zero copy fashion, wherein the respective para-virtualized VM is associated with the respective NIC VF device based on a device association table.

9. The method of claim 8, wherein the device association table indicates a 1:1 bonding relationship between the respective para-virtualized VM and the respective NIC VF device.

10. The method of claim 8, wherein a field programmable gate array or an application-specific integrated circuit generates the receive and the transmit packet descriptors.

11. The method of claim 9, comprising initializing, via a hypervisor, the device association table that indicates the 1:1 bonding relationship between the respective para-virtualized VM and the respective NIC VF device.

12. The method of claim 8, further comprising:
performing, using an input-output memory map unit (IOMMU), direct memory access (DMA) remapping and interrupt remapping for a guest memory space arranged to maintain the data for the packet generated by the respective para-virtualized VM and for a host memory space arranged to maintain the data for the packet received via the respective NIC VF device.

13. The method of claim 12, further comprising:
initializing the plurality of NIC VF devices; and
filling receive and transmit packet descriptors with memory pointers pointing to corresponding receive and transmit packet buffers maintained in the guest memory space, the initializing and filling being performed by a VF driver.

14. A para-virtualization computer system, comprising:
a network interface controller (NIC) to include a plurality of virtual function (VF) devices arranged to access a host memory space;
a plurality of para-virtualized virtual machines (VMs) arranged to access a guest memory space; and
circuitry to:
generate transmit packet descriptors for packets received from the plurality of para-virtualized VMs that are separately associated with a respective VF device from among the plurality of VF devices to enable data for a packet generated by a respective para-virtualized VM to be provided to an associated VF device in a zero copy fashion; and
generate receive packet descriptors for packets received through the plurality of VF devices that are targeting the plurality of para-virtualized VMs to enable data for a packet received via the respective VF device to be provided to the respective para-virtualized VM in a zero copy fashion, wherein the respective para-virtualized VM is associated with the respective VF device based on a device association table.

15. The system of claim 14, wherein the device association table indicates a 1:1 bonding relationship between the respective para-virtualized VM and the respective NIC VF device.

16. The system of claim 14, wherein the circuitry comprises a field programmable gate array or an application-specific integrated circuit.

17. The system of claim 14, wherein the circuitry includes an input-output memory map unit (IOMMU) to perform direct memory access (DMA) remapping and interrupt remapping for the guest memory space, the guest memory space arranged to maintain the data for the packet generated by the respective para-virtualized VM and for a host memory space, the host memory space arranged to maintain the data for the packet received via the respective VF device.

18. The system of claim 14, the circuitry further comprising a VF driver is to initialize the plurality of VF devices and to fill receive and transmit packet descriptors with memory pointers pointing to corresponding receive and transmit packet buffers maintained in the guest memory space.

19. The system of claim 18, the circuitry further comprising a para-virtualization NIC device backend to interact with the plurality of para-virtualized VMs for packet input/output (I/O) based on receive and transmit queue pairs residing in the corresponding receive and transmit packet buffers maintained in the guest memory space.

\* \* \* \* \*